US010661364B2

(12) United States Patent
Laett

(10) Patent No.: US 10,661,364 B2
(45) Date of Patent: May 26, 2020

(54) TOOL CLAMPING DEVICE

(71) Applicant: Robert Bosch GmbH, Stuttgart (DE)

(72) Inventor: Michael Laett, Solothurn (CH)

(73) Assignee: Robert Bosch GmbH, Stuttgart (DE)

( * ) Notice: Subject to any disclaimer, the term of this patent is extended or adjusted under 35 U.S.C. 154(b) by 754 days.

(21) Appl. No.: 14/890,582

(22) PCT Filed: Mar. 31, 2014

(86) PCT No.: PCT/EP2014/056403
§ 371 (c)(1),
(2) Date: Nov. 11, 2015

(87) PCT Pub. No.: WO2014/183916
PCT Pub. Date: Nov. 20, 2014

(65) Prior Publication Data
US 2016/0089733 A1    Mar. 31, 2016

(30) Foreign Application Priority Data
May 13, 2013 (DE) .................. 10 2013 208 691

(51) Int. Cl.
*B23D 51/10*       (2006.01)
(52) U.S. Cl.
CPC .................. *B23D 51/10* (2013.01)
(58) Field of Classification Search
CPC ............ B23D 51/10; Y10T 279/17717; Y10T 279/17803
See application file for complete search history.

(56) References Cited

U.S. PATENT DOCUMENTS 2,701,724 A * 2/1955 Harris ............... B23B 31/16125
279/71
5,251,515 A * 10/1993 Merrick .................. B25B 13/44
279/71

(Continued)

FOREIGN PATENT DOCUMENTS

CN      1349447 A    5/2002
CN      1630571 A    6/2005
(Continued)

OTHER PUBLICATIONS

International Search Report corresponding to PCT Application No. PCT/EP2014/056403, dated Jun. 25, 2014 (German and English language document) (5 pages).

*Primary Examiner* — Sunil K Singh
*Assistant Examiner* — Paul M Janeski
(74) *Attorney, Agent, or Firm* — Maginot, Moore & Beck LLP

(57) ABSTRACT

A tool clamping device, in particular a saw-tool clamping device, for a portable power tool, includes at least one clamping unit configured to clamp-in a machining tool, which comprises at least one movably mounted release element configured to transfer the clamping unit into a releasing position, at least one clamping element configured to produce a clamping-in force acting on the machining tool, at least in a state of the machining tool in which the machining tool is connected to the clamping unit, and at least one movement-arresting element configured to arrest at least one possibility of movement of the release element in at least one state. The movement-arresting element is fixedly connected to the clamping element.

11 Claims, 6 Drawing Sheets

(56) References Cited

U.S. PATENT DOCUMENTS

| | | | | |
|---|---|---|---|---|
| 5,315,902 | A | * | 5/1994 | Ragland ............... B25B 13/44 |
| | | | | 279/71 |
| 5,531,549 | A | * | 7/1996 | Fossella ............... B23B 31/123 |
| | | | | 279/140 |
| 6,295,736 | B1 | | 10/2001 | Dassoulas et al. |
| 8,082,671 | B2 | * | 12/2011 | Saegesser ............. B23D 51/10 |
| | | | | 279/71 |
| 2009/0071015 | A1 | | 3/2009 | Scott |

FOREIGN PATENT DOCUMENTS

| | | | |
|---|---|---|---|
| CN | 1724197 A | | 1/2006 |
| DE | 195 09 539 A1 | | 9/1996 |
| EP | 0 814 934 B1 | | 1/1998 |
| EP | 1 236 530 A1 | | 9/2002 |
| WO | WO 9628274 A1 * | 9/1996 | ............. B23D 51/10 |

* cited by examiner

TOOL CLAMPING DEVICE

This application is a 35 U.S.C. § 371 National Stage Application of PCT/EP2014/056403, filed on Mar. 31, 2014, which claims the benefit of priority to Serial No. DE 10 2013 208 691.1, filed on May 13, 2013 in Germany, the disclosures of which are incorporated herein by reference in their entirety.

BACKGROUND

A tool clamping device, in particular a saw-tool clamping device, for a portable power tool is already known from EP 0 814 934 B1. The tool clamping device in this case has a clamping unit for clamping-in a machining tool, which comprises at least one movably mounted release element, at least for transferring the clamping unit into a release position, at least one clamping element, for generating a clamping-in force acting on the machining tool, at least when the machining tool is in a state in which it is connected to the clamping unit, and at least one movement-arresting element, for arresting at least one movement capability of the release element in at least one state.

SUMMARY

The disclosure is based on a tool clamping device, in particular a saw-tool clamping device, for a portable power tool, having at least one clamping unit for clamping-in a machining tool, which comprises at least one movably mounted release element, at least for transferring the clamping unit into a release position, at least one clamping element, for generating a clamping-in force acting on the machining tool, at least when the machining tool is in a state in which it is connected to the clamping unit, and at least one movement-arresting element, for arresting at least one movement capability of the release element in at least one state.

It is proposed that the movement-arresting element be fixedly connected to the clamping element. A "clamping unit" is to be understood here to mean, in particular, a unit provided to clamp-in a machining tool for machining a workpiece, by means of a positive and/or non-positive connection. The term "provided" is intended, in particular, to define specially designed and/or specially equipped. That an object is provided for a particular function is to be understood to mean, in particular, that the object fulfills and/or executes this particular function in at least one application state and/or operating state. Preferably, the clamping unit is provided to clamp-in the machining tool, when in a state in which it is connected to the clamping unit, along a working movement axis of a driving-force transmission element of a drive unit and/or of a transmission unit of the portable power tool. A main component of a clamping-in force generated by means of the clamping element preferably acts along the working movement axis, in particular along a stroke axis. The driving-force transmission element in this case is realized, particularly preferably, as a lift rod. The tool clamping device, or the clamping unit, is therefore preferably connected to the driving-force transmission element, in particular the lift rod, or arranged on the driving-force transmission element, in particular the lift rod. The machining tool, when in a state in which it is connected to the clamping unit, is preferably clamped-in, by means of the clamping unit, along a stroke axis of the lift rod. It is also conceivable, however, for the clamping unit to be provided to clamp-in the machining tool, when in a state in which it is connected to the clamping unit, along a direction transverse to the stroke axis.

The term "release element" is intended here to define, in particular, an element provided at least to remove a clamping-in force for clamping-in the machining tool, when in a state in which it is connected to the clamping unit, and/or to release a machining-tool receiving recess of the clamping unit. The release element may be realized as a release sleeve, which is operatively connected to an operating element of the clamping unit, or realized directly as an operating element of the clamping unit that can be actuated directly by an operator. Further designs and or arrangements of the release elements considered appropriate by persons skilled in the art are likewise conceivable. A "release position" is intended here to mean, in particular, a position of at least one element of the clamping unit in which a machining tool can be detached, or removed, from the clamping unit. In the release position, the release element preferably releases the machining-tool receiving recess, to enable the machining tool to be removed from the machining-tool receiving recess.

The machining tool, when in a state in which it is connected to the clamping unit and when the clamping unit is in a clamping position, is preferably clamped-in by means of a clamping-in force generated, in particular actively generated, by the clamping element. The machining tool in this case is preferably pressed against a clamping face of the clamping unit by means of a clamping-in force of the clamping element. The clamping face of the clamping unit is preferably arranged on the release element. It is also conceivable, however, for the clamping face to be arranged on a different element of the clamping unit, considered appropriate by persons skilled in the art. The clamping element is preferably realized as an elastic clamping element. Particularly preferably, therefore, the clamping element generates the clamping-in force as a result of elastic deformation. It is also conceivable, however, for the clamping element to be of a different design, considered appropriate by persons skilled in the art, such as, for example, as an electronic actuator, as a hydraulic element, as a pneumatic element, etc.

The movement arresting element is preferably provided to arrest the release element against a movement by means of a positive and/or non-positive connection between the movement arresting element and the release element. It is also conceivable, however, for the movement arresting element to be provided to arrest the release element against a movement by means of a contactless connection such as, for example, by means of magnetic forces. The expression "fixedly connected" is intended here to define, in particular, a non-positive, positive, or materially bonded connection between at least two elements that are provided to transmit forces in at least two mutually opposite directions. The movement arresting element is therefore preferably solidly fixed to the clamping element. The design of the tool clamping device according to the disclosure enables a stable arresting function of the clamping unit to be achieved by simple design means. As a result, advantageously, a high degree of operating convenience can be achieved. Advantageously, an operator can connect the machining tool to the clamping unit using one hand. Moreover, advantageously, a compact clamping unit can be realized. In addition, advantageously, the clamping unit can be held in a release position. This enables the machining tool to be connected to the clamping unit rapidly and with little manipulation.

Furthermore, it is proposed that the movement arresting element be realized so as to be integral with the clamping element. "Integral with" is to be understood to mean, in particular, connected at least in a materially bonded manner, for example by a welding process, an adhesive process, an injection process and/or another process considered appropriate by persons skilled in the art, and/or, advantageously, formed in one piece such as, for example, by being produced from a casting and/or by being produced in a single or multi-component injection process and, advantageously, from a single blank. The movement arresting element in this case may be fixedly connected to the clamping element by means of a welded joint, by means of an adhesive joint, etc., or may be constituted by a common component. The design according to the disclosure advantageously enables savings to be made in assembly work, assembly costs and structural space. Thus, advantageously, a compact tool clamping device can be achieved.

It is additionally proposed that the movement arresting element be realized, at least partially, as a transverse extension of the clamping element. In this case, the movement arresting element preferably extends, at least partially, at least substantially transversely in relation to a direction of main extent of the clamping element. Particularly preferably, the movement arresting element extends, at least in a sub-region of the movement arresting element, perpendicularly in relation to the direction of main extent of the clamping element. The direction of main extent of the clamping element preferably extends at least substantially parallelwise in relation to the stroke axis of the lift rod, when the clamping unit is in a state in which it is mounted on the lift rod. "Substantially transversely" is to be understood here to mean, in particular, an alignment of a direction and/or of an axis relative to a reference direction and/or to a reference axis, wherein the alignment of the direction and/or of the axis is at least different from an at least substantially parallel alignment in relation to the reference direction and/or to the reference axis and, in particular, is oblique or perpendicular in relation to the reference direction and/or to the reference axis. The expression "substantially perpendicularly" is intended here to define, in particular, an alignment of a direction relative to a reference direction, wherein the direction and the reference direction, in particular as viewed in one plane, enclose an angle of 90° and the angle has a maximum deviation of, in particular, less than 8°, advantageously less than 5°, and particularly advantageously less than 2°. "Substantially parallelwise" is to be understood here to mean, in particular, an alignment of a direction relative to a reference direction, in particular in one plane, wherein the direction deviates from the reference direction by, in particular, less than 8°, advantageously less than 5°, and particularly advantageously less than 2°. The design according to the disclosure makes it possible to arrest the movement of the release element in at least one direction in a structurally simple and reliable manner.

Moreover, it is proposed that the release element have at least one stop element that, in at least one state, acts in combination with the movement arresting element. The stop element is preferably realized as a stop cam. It is also conceivable, however, for the stop element to be of a different design, considered appropriate by persons skilled in the art, such as, for example, as a latching recess, as a latching extension, as a movably mounted stop pin, etc. The design according to the disclosure advantageously enables a secure, positive connection to be realized between the stop element and the movement arresting element for the purpose of arresting movement in at least one direction.

Furthermore, it is proposed that the clamping unit have at least one centering element, which is provided to guide the movement arresting element. The centering element in this case is preferably provided to receive the movement arresting element in an axially movable and non-rotatable manner. The movement arresting element is therefore preferably guided in a rotationally fixed manner by means of the centering element. By means of the design according to the disclosure, advantageously, reliable functioning of the movement arresting element can be ensured.

Advantageously, the centering element has at least one guide recess, through which the movement arresting element extends, at least partially. The guide recess is preferably realized as an elongate hole. The guide recess in this case, when in a state in which it is mounted on the lift rod, preferably extends at least substantially parallelwise in relation to the stroke axis of the lift rod. Thus, advantageously, it is possible to delimit a possible movement distance of the movement arresting element. In addition, advantageously, the movement arresting element can be secured on the centering element.

Moreover, it is proposed that the centering element have a machining-tool receiving recess, which is arranged adjacently to the guide recess of the centering element for guiding the movement arresting element. Preferably, the machining-tool receiving recess is realized so as to correspond to a connecting region of the machining tool. The machining tool is preferably realized as a jigsaw blade. It is also conceivable, however, for the machining tool to be of a different design, considered appropriate by persons skilled in the art, such as, for example, a saber saw blade, etc. The design according to the disclosure advantageously makes it possible to realize a compact clamping unit.

In addition, it is proposed that the release element be rotatably mounted. Particularly preferably, the release element is realized as a release sleeve. The release sleeve in this case preferably comprises an actuating extension, by means of which an actuating force of an operator can be made to act on the release sleeve. The actuating extension extends at least substantially transversely in relation to a movement axis of the release element, in particular of the release sleeve. The movement axis of the release element in this case preferably extends at least substantially parallelwise in relation to the stroke axis of the lift rod, in particular when the clamping unit is in a state in which it is mounted on the lift rod. Preferably, the movement axis of the release element extends at least substantially parallelwise in relation to a main direction of action of the clamping element. In particular, the release element is mounted so as to be rotatable, along an angular range of greater than 5°, preferably greater than 10°, and particularly preferably greater than 15°, about the movement axis of the release element. The design according to the disclosure makes it possible, advantageously, to realize a release function of the clamping unit that is convenient to operate.

Furthermore, it is proposed that the clamping element be realized as a spring element. A "spring element" is to be understood to mean, in particular, a macroscopic element having at least one extent that, in a normal operating state, can be varied elastically by at least 10%, in particular by at least 20%, preferably by at least 30%, and particularly advantageously by at least 50% and that, in particular, generates a counter-force, which is dependent on the variation of the extent and preferably proportional to the variation and which counteracts the variation. An "extent" of an element is to be understood to mean, in particular, a maximum distance of two points of a perpendicular projection of the element on to a plane. A "macroscopic element" is to be understood to mean, in particular, an element having an extent of at least 1 mm, in particular of at least 5 mm, and preferably of at least 10 mm. The clamping element is preferably realized as a compression spring. In this case, the clamping element is preferably realized as a helical spring. It is also conceivable, however, for the clamping element to be of a different design, considered appropriate by persons skilled in the art, such as, for example, designed as a tension spring, as a torsion spring, as a leaf spring, as an evolute spring, as a disk spring, etc. The design according to the disclosure advantageously enables a clamping-in force to be generated by simple design means. Moreover, advantageously, a compact clamping unit can be realized.

The disclosure is additionally based on the clamping element of the clamping unit of the tool clamping device according to the disclosure. The clamping element in this case preferably has a clamping-force generating region, which is realized as a helical spring region. It is also conceivable, however, for the clamping-force generating region to be of a different design, considered appropriate by persons skilled in the art, such as, for example, designed as a leaf-spring region, leg-spring region, etc. In addition, the clamping element preferably comprises an arresting region, which constitutes the movement arresting element that is fixedly connected to the clamping element. The arresting region is preferably integral with the clamping-force generating region. The clamping unit according to the disclosure makes it possible, advantageously, to achieve a compact clamping unit that is very convenient to operate.

In addition, the disclosure is based on a portable power tool having a tool clamping device according to the disclosure. A "portable power tool" is to be understood here to mean, in particular, a power tool, for performing work on workpieces, that can be transported by an operator without the use of a transport machine. The portable power tool has, in particular, a mass of less than 40 kg, preferably less than 10 kg, and particularly preferably less than 5 kg. Preferably, the portable power tool is realized as a jigsaw. It is also conceivable, however, for the portable power tool to be of a different design, considered appropriate by persons skilled in the art, such as, for example, designed as a saber saw, etc. By means of the design according to the disclosure, an operator of the portable power tool can advantageously be provided with a high degree of operating convenience. Advantageously, it is made possible for the clamping unit to be held in a release position, in which the machining-tool receiving recess is released, to allow convenient insertion of a machining tool.

The tool clamping device according to the disclosure and/or the portable power tool according to the disclosure are/is not in this case intended to be limited to the application and embodiment described above. In particular, the tool clamping device according to the disclosure and/or the portable power tool according to the disclosure, for the purpose of implementing a functioning mode described herein, may have individual elements, components and units that differ in number from a number stated herein.

BRIEF DESCRIPTION OF THE DRAWINGS

Further advantages are given by the following description of the drawing. The drawing shows an exemplary embodiment of the disclosure. The drawing, the description and the claims contain numerous features in combination. Persons skilled in the art will also expediently consider the features individually and combine them to create appropriate further combinations.

There are shown in.

DETAILED DESCRIPTION

Figure 1:
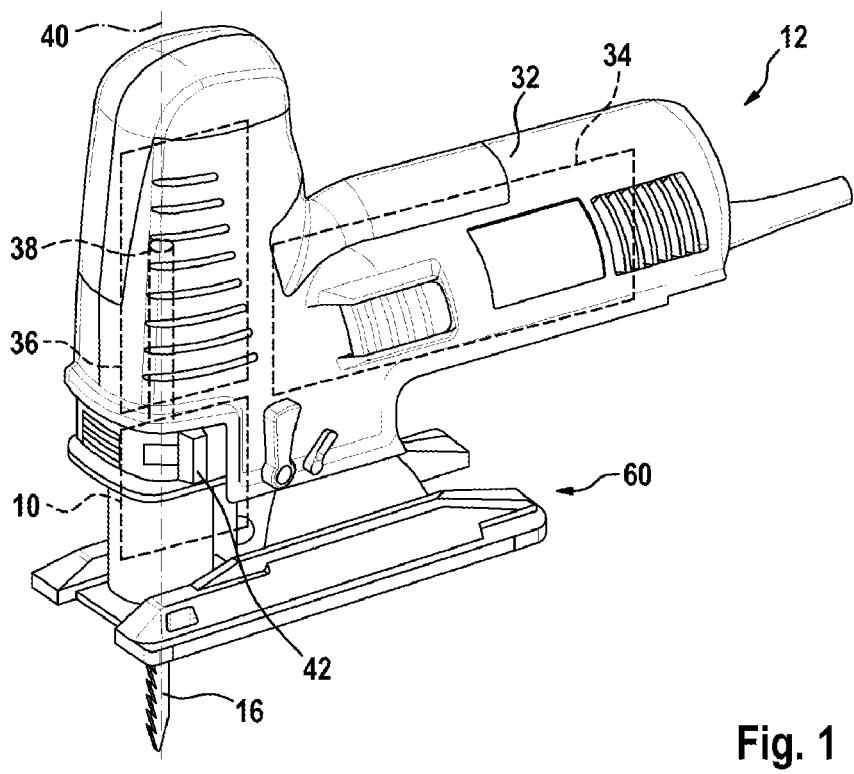
FIG. 1 a portable power tool according to the disclosure, having a tool clamping device according to the disclosure, in a schematic representation, FIG. 2 a perspective view of the tool clamping device according to the disclosure in a release position of a clamping unit of the tool clamping device according to the disclosure, in a schematic representation, FIG. 3 a top view of the tool clamping device according to the disclosure in a release position of the clamping unit, in a schematic representation, FIG. 4 a sectional view of the tool clamping device according to the disclosure in a release position of the clamping unit, in a schematic representation, FIG. 5 a top view of the tool clamping device according to the disclosure in a clamping position of the clamping unit, in a schematic representation, FIG. 6 a sectional view of the tool clamping device according to the disclosure in a clamping position of the clamping unit, in a schematic representation, FIG. 7 a further sectional view of the tool clamping device according to the disclosure in a clamping position of the clamping unit, in a schematic representation, FIG. 8 a detail view of a centering element of the clamping unit, in a schematic representation, FIG. 9 a sectional view of the centering element, in a schematic representation, and FIG. 10 a detail view of a clamping element of the clamping unit, in a schematic representation.

FIG. 1 shows a portable power tool 12, realized as a jigsaw, having a tool clamping device 10. The portable power tool 12 has a power-tool housing 32. The power-tool housing 32 encloses a drive unit 34 of the portable power tool 12 and a transmission unit 36 of the portable power tool 12. The drive unit 34 and the transmission unit 36 are provided to drive a machining tool 16, which is clamped-in in the tool clamping device 10, in an oscillatory manner. The machining tool 16 in this case is driven in an oscillatory manner substantially perpendicularly in relation to a machining movement direction of the portable power tool 12. The machining tool 16 is realized as a jigsaw blade. It is also conceivable, however, for the machining tool 16 to be constituted by a different machining tool, considered appropriate by persons skilled in the art.

The transmission unit 36 has a driving-force-transmission element, realized as a lift rod 38, for driving the tool fixedly clamped by means of the clamping unit 14. The tool clamping device 10 in this case is arranged on the lift rod 38, or connected in respect of drive to the lift rod 38, in a manner already known to persons skilled in the art. The tool clamping device 10 is thus provided to couple the machining tool 16 to the lift rod 38 for the purpose of oscillating drive. The machining tool 16 thus executes a stroke motion along a stroke axis 40 of the lift rod 38. In addition, the drive unit 34 and/or the transmission unit 36 are/is provided, in at least one operating mode of the portable power tool 12, to drive the machining tool 16 with a pendulum action along a direction transverse to the stroke axis 40, in a manner already known to persons skilled in the art. In one operating state, therefore, the machining tool 16 executes a pendulum-action stroke. For the purpose of support on a workpiece the portable power tool 12 additionally has a support unit 60, already known to persons skilled in the art. The support unit 60 in this case may be mounted on the power-tool housing 32 so as to be movable relative to the power-tool housing 32, or arranged on the power-tool housing 32 such that its position cannot be altered.

Figure 7:
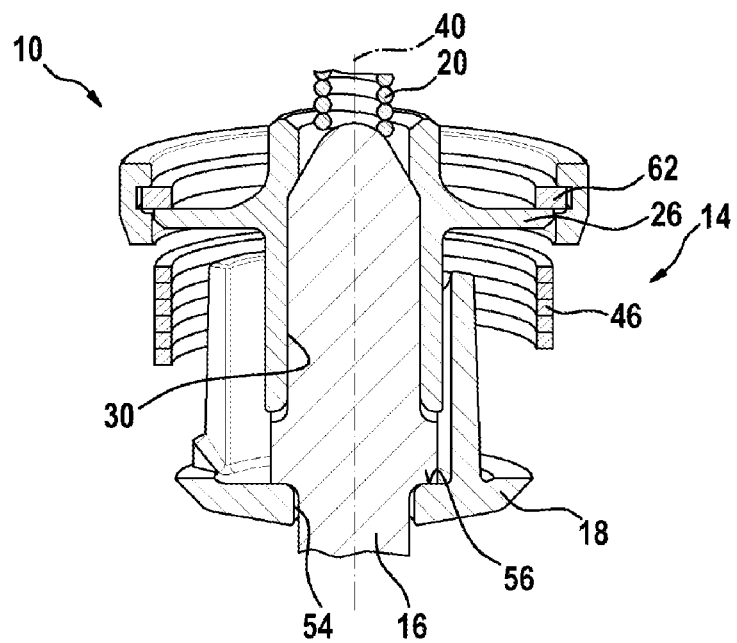
Figure 8:
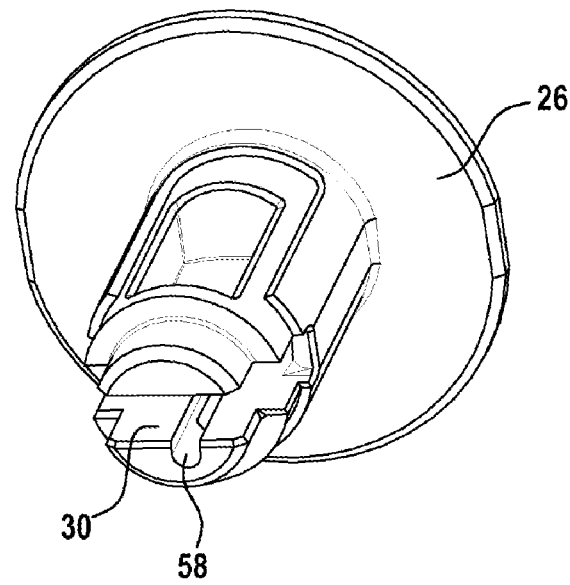

The tool clamping device 10 is realized as a saw-tool clamping device. In this case, the tool clamping device 10 of the portable power tool 12 has at least one clamping unit 14 for clamping-in the machining tool 16. The clamping unit 14 has at least one movably mounted release element 18, at least for transferring the clamping unit 14 into a release position, and at least one clamping element 20, for generating a clamping-in force acting on the machining tool 16, at least when the machining tool 16 is in a state in which it is connected to the clamping unit 14. The clamping element 20 is realized as a spring element. The clamping element 20 in this case is realized as a compression spring. The clamping element 20 is thus provided to apply a spring force to the machining tool in the direction of a clamping face 56 of the clamping unit 14 when the clamping unit 14 is in a clamping position, at least when the machining tool 16 is in a state in which it is disposed in the clamping unit 14 (FIG. 7). The clamping face 56 of the clamping unit 14 is arranged on the release element 18. In this case, the clamping face 56 of the clamping unit 14 is constituted by a face of the release element 18 that delimits an insertion recess 54 of the release element 18.

Figure 2:
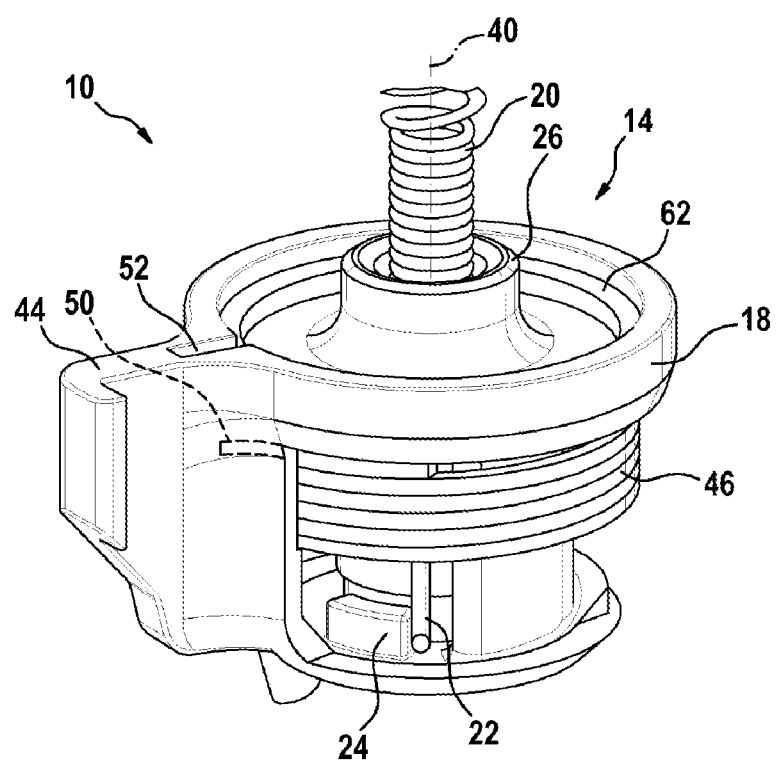
Figure 4:
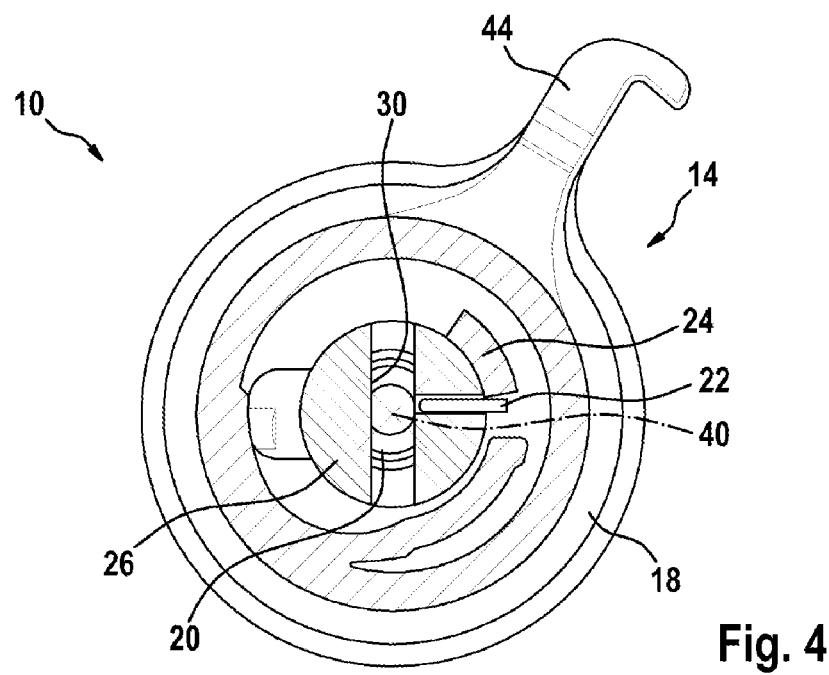
Figure 6:
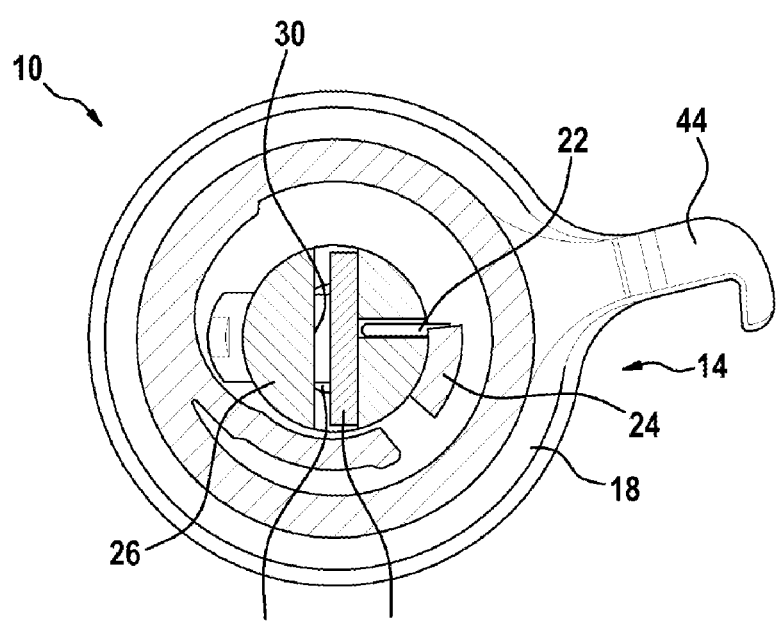

The clamping unit 14 additionally comprises at least one movement arresting element 22, for arresting at least one movement capability of the release element 18 in at least one state (FIGS. 2 and 4). The release element 18 is rotatably mounted. In this case, the release element 18, when in the mounted state, is rotatably mounted in the power-tool housing 32. The release element 18 is realized as a release sleeve, which is mounted so as to be rotatable about the stroke axis 40. The movement arresting element 22 is thus provided to arrest the release element 18, when in a state in the release position in which the machining tool 16 has been removed from the clamping unit 14, against a rotational movement. The clamping unit 14 is thereby held in an open position to enable the machining tool 16 to be inserted in a manner already known to persons skilled in the art. For the purpose of arresting the release element 18, the release element 18 has at least stop element 24 that, in at least one state, acts in combination with the movement arresting element 22 (FIGS. 2, 4 and 6). The stop element 24 is realized as a cam. The cam extends, partially, at least substantially parallelwise in relation to the stroke axis 40. In this case, the cam extends out from the release element 18 in the direction of the power-tool housing 32. Moreover, the stop element 24 is integral with the release element 18. It is also conceivable, however, for the stop element 24 to be of a different design and/or arrangement, considered appropriate by persons skilled in the art.

The release element 18, for the purpose of moving from a clamping position of the release element 18, when the clamping unit 14 is in a clamping position, into a release position of the release element 18, when the clamping unit 14 is in a release position, is connected to an operating element 42 of the clamping unit 14. The operating element 42 is mounted on the power-tool housing 32 so as to be pivotable about a pivot axis of the operating element 42 that is at least substantially parallel to the stroke axis 40. For the purpose of connection, or transferring operating force, between the release element 18 and the operating element 42, the release element 18 has at least one actuating extension 44 (FIG. 2). The actuating extension 44 extends at least substantially transversely in relation to a movement axis of the release element 18. The movement axis of the release element 18 is at least substantially parallel to the stroke axis 40, or is constituted by the stroke axis 40. For the purpose of transmitting operating force, the actuating extension 44 acts in combination with an actuating region (not represented in greater detail here) of the operating element 42, in a manner already known to persons skilled in the art. In this case, the actuating region of the operating element 42 may be realized as a recess in which the actuating extension 44 engages, or as an extension behind which the actuating extension 44 engages, and thus enables operating force to be transmitted upon a pivot movement of the operating element 42.

Furthermore, the clamping unit 14 has a release spring element 46, which applies a spring force to the release element 18 in the direction of a clamping position of the release element 18 (represented in FIGS. 2, 3, 5 and 7). The release spring element 46 is realized as a torsion spring, or as a leg spring. In order for a spring force to act on the release element 18, therefore, the release spring element 46 is supported with one end 48, or limb, (FIG. 3) on the lift rod 38 or on the power-tool housing 32, and with a further end 50, or limb, (FIG. 2) the release spring element 46 is supported on the release element 18. It is also conceivable, however, for the release spring element 46 to be of a different design, considered appropriate by persons skilled in the art, such as, for example, designed as a tension spring or as a compression spring, etc. For the purpose of receiving the further end 50, or the further limb, of the release spring element 46, the release element 18 has a spring receiver 52 (FIG. 2). The spring receiver 52 is in the shape of a slot, which extends at least substantially parallelwise in relation to the movement axis of the release element 18.

Figure 3:
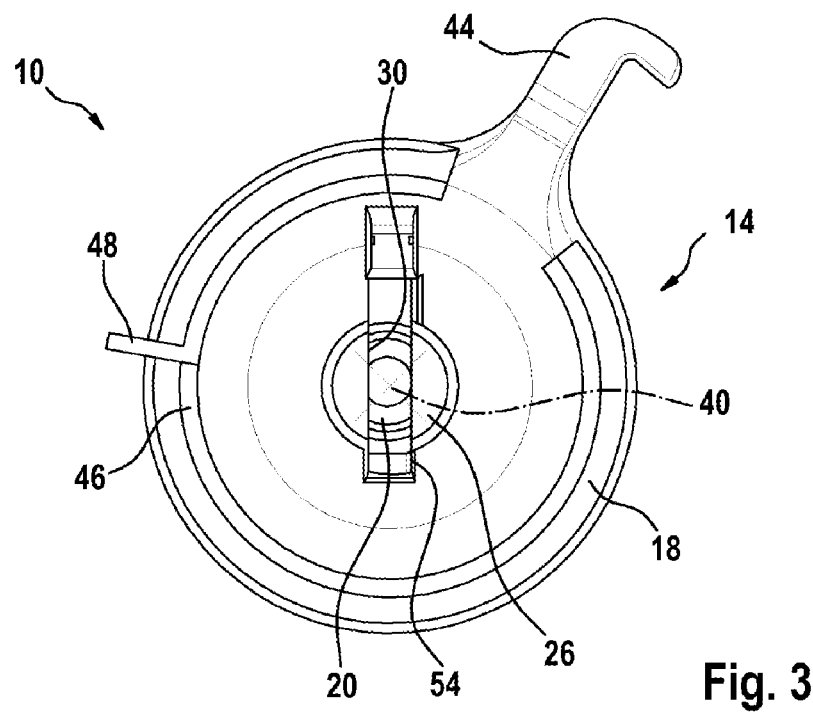

FIGS. 2 to 4 show the clamping unit 14 in a release position, in which the release element 18 is arrested, or held in a release position by means of the movement arresting element 22. The movement arresting element 22 in this case, as viewed along a circumferential direction running in a plane that extends at least substantially perpendicularly in relation to the stroke axis 40, bears against the stop element 24. Thus, by means of a positive connection between the movement arresting element 22 and the stop element 24, the release element 18 is arrested against a rotational movement resulting from a spring force of the release spring element 46 acting on the release element 18. The movement arresting element 22 is fixedly connected to the clamping element 20. The movement arresting element 22 in this case is integral with the clamping element 20. The movement arresting element 22 is thus formed on to the clamping element 20 realized as a spring element. The movement arresting element 22 is realized, at least partially, as a transverse extension of the clamping element 20. The movement arresting element 22 in this case extends, at least partially, at least substantially transversely in relation to a main deformation axis of the clamping element 20. The movement arresting element 22 is thus constituted as a limb of the clamping element 20 realized as a spring element. The main deformation axis of the clamping element 20 is at least substantially parallel to the stroke axis 40, or is constituted by the stroke axis 40.

Figure 9:
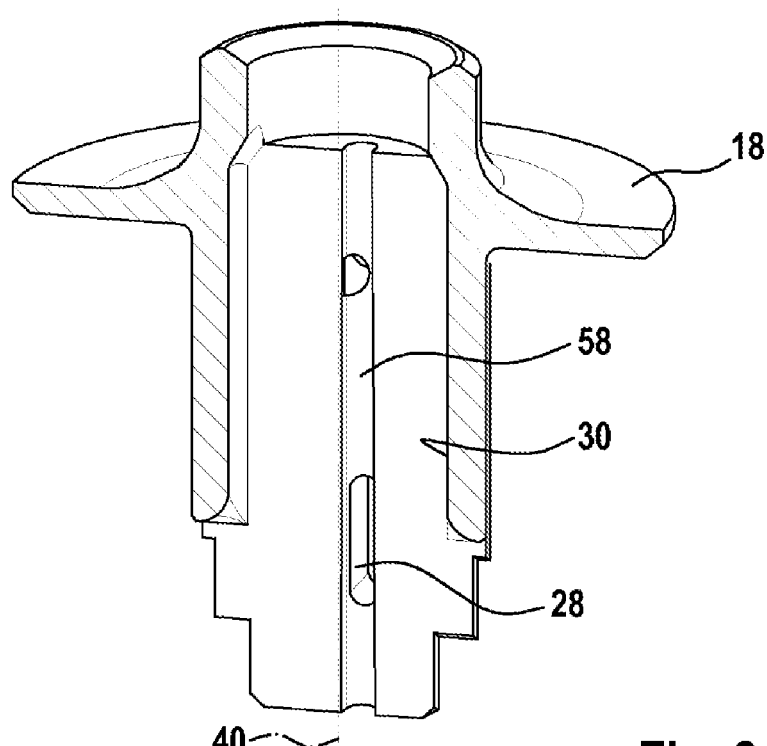
Figure 10:
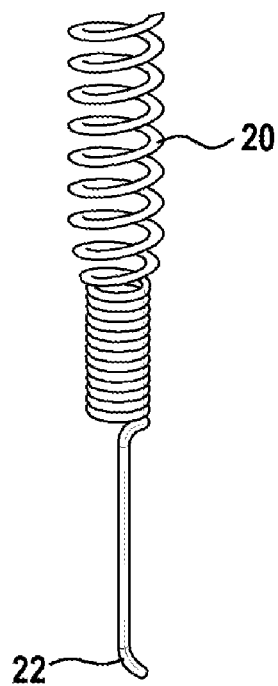

Furthermore, the clamping unit 14 comprises at least one centering element 26, which is provided to guide the movement arresting element 22 (FIGS. 4, 6, 8 and 9). For this purpose, the centering element 26 has at least one guide recess 28, through which the movement arresting element 22 extends, at least partially (FIGS. 4, 6 and 9). In addition, the guide recess 28 is provided to arrange the movement arresting element 22 in the centering element 26 such that it is fixed against rotation relative to the centering element 26. The guide recess 28 is realized as an elongate hole. The guide recess 28 in this case has a direction of main extent that is at least substantially parallel to the stroke axis 40. In addition to guiding the movement arresting element 22, therefore, the guide recess 28 is provided to delimit a movement distance of the movement arresting element 22 along a direction that is at least substantially parallel to the stroke axis 40. In addition, the centering element 26 comprises at least one longitudinal cavity 58, which is provided to receive a longitudinal limb of the movement arresting element 22. The longitudinal limb of the movement arresting element 22 extends at least substantially parallelwise in relation to the stroke axis 40, or main deformation axis of the clamping element 20 (FIG. 10). In addition, the longitudinal limb of the movement arresting element 22 connects a transverse limb of the movement arresting element 22 that, when the movement arresting element 22 is in a mounted state, extends through the guide recess 28, to the clamping element 20, or to a final turn portion of the clamping element 20.

Figure 5:
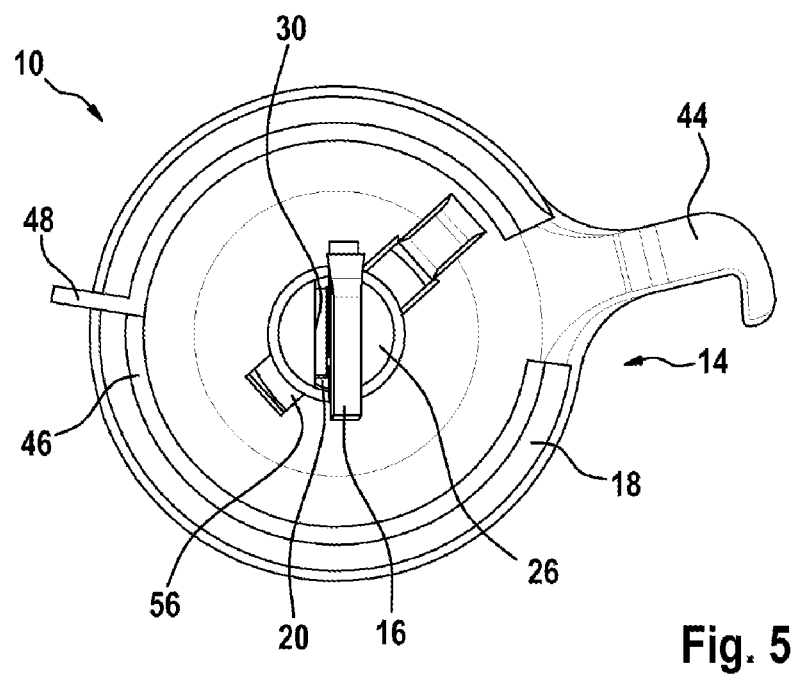

The centering element 26 additionally has a machining-tool receiving recess 30, which is arranged adjacently to the guide recess 28 of the centering element 26 for guiding the movement arresting element 22 (FIGS. 5 to 7). The machining-tool receiving recess 30 is provided to receive the machining tool 16. For this purpose, the machining-tool receiving recess 30 is in the shape of a slot, into which the machining tool 16 can be inserted when the release element 18 is in a release position, when the clamping unit 14 is in a release position. The centering element 26 is surrounded by the release element 18 along the circumferential direction. The centering element 26 is thus arranged inside the release element 18. For the purpose of securing the centering element 26 on the release element 18, the clamping unit 14 has a securing element 62. The securing element 62 is realized as a snap ring, which is arranged in a groove of the release element 18 (FIG. 7).

For the purpose of fixedly clamping the machining tool 16 to the clamping unit 14, the machining tool 16 is inserted in the machining-tool receiving recess 30 when the clamping unit 14 is in a release position in which the release element 18 is held in a release position by means of the movement arresting element 22. As a result of the machining tool 16 being inserted in the machining-tool receiving recess 30, the clamping element 20 is moved against a spring force of the clamping element 20. This causes the movement arresting element 22 to become disengaged from the stop element 24. As soon as the movement arresting element releases a movement capability of the release element 18, the release element 18 moves into a clamping position as a result of a spring force of the release spring element 46. When in a clamping position, the release element 18 at least partially covers an insertion opening of the machining-tool receiving recess 30. The clamping element 20 exerts a clamping-in force on the machining tool 16 inserted in the clamping unit 14. In this case, when the clamping unit 14 is in a clamping position, the machining tool 16 is pressed on to the clamping face 56 by action of the clamping-in force generated by a spring force of the clamping element 20. The clamping unit 14 is thus in a clamping position.

For the purpose of removing, or changing, the machining tool 16, the operating element 42 is moved, which moves the release element 18 against a spring force of the release spring element 46, as a result of which the machining-tool receiving recess 30 is released again. As the result of a clamping force acting on the machining tool 16, the machining tool 16 is moved out of, or ejected from, the machining-tool receiving recess 30 as soon as the machining-tool receiving recess 30 is released. In addition, the movement arresting element 22 is moved in the direction of the stop element 24, until the movement arresting element 22 engages behind the stop element 24, as viewed along the circumferential direction, or until the movement arresting element 22 bears against the clamping face 56. After the machining tool 16 has been removed, or ejected, from the machining-tool receiving recess 30, the release element 18 is thus again arrested, by means of the movement arresting element 22, against a movement resulting from a spring force of the release spring element 46 in a release position.

The invention claimed is:

1. A tool clamping device, comprising:
at least one clamping unit configured to clamp-in a machining tool, the at least one clamping unit comprising:
at least one movably mounted release element configured to at least transfer the at least one clamping unit into a release position;
at least one clamping element configured to generate a clamping-in force acting on the machining tool, at least in a clamping position in which the machining tool is connected to the at least one clamping unit; and
at least one movement arresting element configured to arrest rotational movement of the at least one movably mounted release element the release position,
wherein the movement arresting element is permanently fixedly connected to the at least one clamping element.

2. The tool clamping device as claimed in claim 1, wherein the at least one movement arresting element is integral with the at least one clamping element.

3. The tool clamping device as claimed in claim 1, wherein the at least one movement arresting element is configured, at least partially, as a transverse extension of the at least one clamping element.

4. The tool clamping device as claimed in claim 1, wherein the at least one movably mounted release element has at least one stop element that, in the release position, acts in combination with the at least one movement arresting element to arrest rotational movement of the at least one movably mounted release element.

5. The tool clamping device as claimed in claim 1, wherein the at least one clamping unit has at least one centering member configured to guide the at least one movement arresting element.

6. The tool clamping device as claimed in claim 5, wherein the at least one centering member defines at least one guide recess, through which the at least one movement arresting element extends, at least partially.

7. The tool clamping device as claimed in claim 6, wherein the at least one centering member defines a machining-tool receiving recess arranged adjacently to the at least one guide recess of the at least one centering member and configured to guide the at least one movement arresting element.

8. The tool clamping device as claimed in claim 1, wherein the at least one movably mounted release element is rotatably mounted so as to rotate about a movement axis of the at least one movably mounted release element.

9. The tool clamping device as claimed in claim 1, wherein the at least one clamping element includes a spring element.

10. A clamping element of a clamping unit of a tool clamping device, comprising:
a spring configured to generate a clamping-in force acting on a machining tool, at least in a clamping position in which the machining tool is connected to the clamping unit, the spring permanently fixedly connected to at least one movement arresting element, the at least one movement arresting element configured to arrest rotational movement of at least one movably mounted release element in a clamping position, the at least one movably mounted release element configured to at least transfer the clamping unit into the release position.

11. A portable power tool, comprising:
a tool clamping device including at least one clamping unit configured to clamp-in a machining tool, the at least one clamping unit including:
  at least one movably mounted release element configured to at least transfer the at least one clamping unit into a release position;
  at least one clamping element configured to generate a clamping-in force acting on the machining tool, at least in a clamping position in which the machining tool is connected to the at least one clamping unit; and
  at least one movement arresting element configured to arrest rotational movement of the at least one movably mounted release element in the release position,
wherein the movement arresting element is permanently fixedly connected to the at least one clamping element.

* * * * *

UNITED STATES PATENT AND TRADEMARK OFFICE
CERTIFICATE OF CORRECTION

PATENT NO. : 10,661,364 B2  
APPLICATION NO. : 14/890582  
DATED : May 26, 2020  
INVENTOR(S) : Michael Laett Page 1 of 1

It is certified that error appears in the above-identified patent and that said Letters Patent is hereby corrected as shown below:

In the Claims

In Claim 1, at Column 10, Line 23, insert the word --in-- between the words "element" and "the".

Signed and Sealed this  
Twenty-fourth Day of November, 2020

Andrei Iancu  
*Director of the United States Patent and Trademark Office*